United States Patent
He et al.

(10) Patent No.: US 10,072,182 B2
(45) Date of Patent: Sep. 11, 2018

(54) RESINOUS PENETRATION PERMEABLE PAVEMENT MATERIAL AND MANUFACTURING METHOD THEREOF

(71) Applicant: Shenzhen Traffic Construction Engineering Test & Detection Center, Shenzhen (CN)

(72) Inventors: Guiping He, Shenzhen (CN); Zheng Sun, Shenzhen (CN); Xixi Hou, Shenzhen (CN); Zhisong Huang, Shenzhen (CN); Quncong Qiu, Shenzhen (CN); Xiaohua Jiang, Shenzhen (CN); Hua Chen, Shenzhen (CN)

(*) Notice: Subject to any disclaimer, the term of this patent is extended or adjusted under 35 U.S.C. 154(b) by 97 days.

(21) Appl. No.: 14/860,756

(22) Filed: Sep. 22, 2015

(65) Prior Publication Data

US 2016/0208140 A1    Jul. 21, 2016

(30) Foreign Application Priority Data

Jan. 16, 2015   (CN) .......................... 2015 1 0022060

(51) Int. Cl.
```
C08K 3/26       (2006.01)
C08K 5/01       (2006.01)
C08K 5/12       (2006.01)
C08L 95/00      (2006.01)
C09D 195/00     (2006.01)
C08L 63/00      (2006.01)
C09D 163/00     (2006.01)
C04B 26/26      (2006.01)
E01C 19/00      (2006.01)
```

(52) U.S. Cl.
CPC ............ *C09D 195/005* (2013.01); *C08K 3/26* (2013.01); *C08K 5/01* (2013.01); *C08K 5/12* (2013.01); *C08L 95/005* (2013.01); *C09D 163/00* (2013.01); *E01C 19/00* (2013.01); *C08K 2003/265* (2013.01); *C08L 2555/28* (2013.01); *C08L 2555/52* (2013.01); *C08L 2555/60* (2013.01); *C08L 2555/80* (2013.01)

(58) Field of Classification Search
CPC .......... C08L 63/00–63/10; C08L 95/00; C08L 95/005; C08L 2555/28; C08L 2555/52; C08L 2555/60; C08L 2555/80; C09D 163/00–163/10; C09D 195/00; C09D 195/005; C09J 163/00–163/10; C09J 195/00; C09J 195/005; B01F 3/14; E01C 19/00; E01C 19/02; C08K 3/26; C08K 5/01; C08K 5/12
See application file for complete search history.

(56) References Cited

U.S. PATENT DOCUMENTS 6,559,206 B1 *  5/2003  Durand ................. C08L 95/005
                                                        106/277
2016/0215142 A1 *  7/2016  Zhang ................... C08L 95/005

* cited by examiner

*Primary Examiner* — Kregg T Brooks
(74) *Attorney, Agent, or Firm* — Wayne & Ken, LLC; Tony Hom

(57) ABSTRACT

The present invention discloses a resin infusion type water-permeable pavement material, comprising: a basic bituminous mixture, waterborne epoxy resin, a waterborne curing agent, a toughening agent and a diluting agent; and the basic bituminous mixture comprises coarse aggregate, fine aggregate, fillers and high-viscosity modified bitumen. A water-permeable pavement prepared by the material provided by the present invention has excellent interface bonding capability, favorable road utilization performance and functional performance.

5 Claims, No Drawings

RESINOUS PENETRATION PERMEABLE PAVEMENT MATERIAL AND MANUFACTURING METHOD THEREOF

CROSS-REFERENCE TO RELATED APPLICATIONS

This application is a continuation in part of, and claims priority to, Chinese Patent Application No. 201510022060.8 with a filing date of Jan. 16, 2015 The contents of all of the aforementioned application, including any intervening amendments thereto, are incorporated herein by reference.

TECHNICAL FIELD

The present invention relates to the technical field of pavement surface layers of all grades of roads, in particular to a resin infusion type water-permeable pavement material and a preparation method thereof.

BACKGROUND OF THE PRESENT INVENTION

With the improvement of economic level, the increasing vehicles not only cause crowded urban traffic, but also bring more noise pollution to the quality of life of broad people. Meanwhile, in recent years, the global climatologic change is abnormal, and many cities in China encounter heavy rain (waterlogging) which is the harshest in years, causing traffic inconvenience and also generating an adverse effect on national economy. In view of the above condition, China has begun to popularize and apply an open graded friction course as early as 10 years ago, wherein the open graded friction course is most widely applied in Jiangsu and Zhejiang provinces and has obtained a good effect since applied so far.

The open graded friction course, abbreviated as OGFC, is open graded bituminous concrete with large void. It has the obvious functions of large voidage (porosity is 18% to 25%), pore communication, drainage, skid resistance, noise reduction and the like, can effectively alleviate urban waterlogging caused by heavy rain, and can also reduce noise pollution resulted from the friction between wheels and a pavement in the process of driving. According to a strength forming principle of a bituminous pavement, the shear strength of an OGFC pavement mainly comes from a high internal friction angle resulted from its graded characteristic, but the cohesive force of the OGFC pavement is relatively lower. Although domestic broad scholars have successfully developed all kinds of high-viscosity modified bitumen later with respect to the disadvantage of inadequate cohesive force of OGFC and an engineering application effect is ideal, under the action of heavy-load traffic, the OGFC prepared by the high-viscosity modified bitumen still has the difficult problem of inadequate shear resistant capability. In addition, the solution of paving the OGFC on conventional close graded bituminous concrete has the problem that once water penetrates into the close graded bituminous concrete, more serious damage to the overall pavement will be caused.

SUMMARY OF THE PRESENT INVENTION

To solve the above-mentioned technical problem, the purpose of the present invention is to provide a resin infusion type water-permeable pavement material and a preparation method thereof. The material uses a bituminous mixture with ultra-large void as a base body, and after the material is formed, a mixture of the waterborne epoxy resin and a curing agent is infused so as to prepare a pavement material having excellent interface bonding capability, favorable road utilization performance and functional performance.

The purpose of the present invention is realized by the following technical solution:

A resin infusion type water-permeable pavement material, comprising:

a basic bituminous mixture, waterborne epoxy resin, a waterborne curing agent, a toughening agent and a diluting agent; and the basic bituminous mixture comprises coarse aggregate, fine aggregate, fillers and high-viscosity modified bitumen.

A preparation method for the resin infusion type water-permeable pavement material, wherein the method comprises:

selecting the coarse aggregate, the fine aggregate, the fillers and the high-viscosity modified bitumen;

putting the coarse aggregate and the fine aggregate into a stirring device and stirring for 60 s; adding the high-viscosity modified bitumen and stirring for 90 s; then, adding the fillers and stirring for 90 s; and heating the stirring device to a temperature of 170° C. to obtain the basic bituminous mixture;

adding the waterborne epoxy resin in a container, and adding the waterborne curing agent, the toughening agent and the diluting agent in the waterborne epoxy resin and stirring evenly to form a resin mixture;

and infusing the basic bituminous mixture into the resin mixture and maintaining for 1 to 2 h to obtain the resin infusion type water-permeable pavement material.

Compared with the prior art, one or more embodiments of the present invention can have the following advantages:

1. The curing reaction of the infused waterborne epoxy resin is finished on the existing bituminous membrane surface, which is equivalent to increasing the contact area between two kinds of aggregate, thereby contributing to the improvement of the overall bonding capability.
2. The waterborne epoxy resin is thermosetting material and can improve the high temperature stability of the water-permeable pavement material.
3. The curing reaction of the infused waterborne epoxy resin may also be finished in part on the bottom surface of the basic bituminous mixture, so that the bonding of the infused waterborne epoxy resin with a lower layer is enhanced and simultaneously a favorable waterproof seal coat action can also be formed.
4. Water in the infused waterborne epoxy resin and the curing agent is demulsified and volatilized along with the progress of the curing reaction. In this way, various micro communication pores are formed in the overall material. These micro pores cooperate with built-in communication pores of the basic bituminous mixture together so that an acoustic wave reflection line which enters the material is lengthened and acoustic wave energy loss is increased, thereby having a more obvious noise reduction effect.

DETAILED DESCRIPTION OF THE EMBODIMENTS

To make the purpose, the technical solution and the advantages of the present invention more clear, the present invention will be further described below in detail in combination with the embodiments.

The present embodiment provides a resin infusion type water-permeable pavement material, comprising: a basic bituminous mixture, waterborne epoxy resin, a waterborne curing agent, a toughening agent and a diluting agent; and the basic bituminous mixture comprises coarse aggregate, fine aggregate, fillers and high-viscosity modified bitumen.

The mass ratio of the above-mentioned coarse aggregate, the above-mentioned fine aggregate, the above-mentioned fillers to the above-mentioned high-viscosity modified bitumen is: 100:0-5:3-7:2-4.

The mass ratio of the above-mentioned waterborne epoxy resin, the above-mentioned waterborne curing agent, the above-mentioned toughening agent to the above-mentioned diluting agent is: 100:80-100:4-10:4-8.

The above-mentioned coarse aggregate is basalt, diabase or diorite, having a nominal grain size not greater than 16 mm.

The above-mentioned fine aggregate is basalt, diabase or diorite, having a nominal grain size not greater than 4.75 mm.

The above-mentioned fillers are limestone mineral powder.

The above-mentioned toughening agent is dioctyl phthalate or dibutyl phthalate.

The above-mentioned diluting agent is xylene.

The above-mentioned preparation method for the resin infusion type water-permeable pavement material is described in detail through the following embodiments:

Embodiment 1

Preparation of the Basic Bituminous Mixture with Ultra-Large Pore

The mass ratio of the coarse aggregate, the fine aggregate, the fillers to the high-viscosity modified bitumen is: 100:0:3:2, and the coarse aggregate, the fine aggregate, the fillers and the high-viscosity modified bitumen are selected for standby. The coarse aggregate and the fine aggregate are added in a stirring pan and stirred for 60 s; the high-viscosity modified bitumen is added and stirred for 90 s; finally, the fillers are added and stirred for 90 s, wherein the coarse aggregate, the fine aggregate and the fillers are heated to 165° C., the heating temperature of the high-viscosity modified bitumen is 170° C., and the set temperature of the stirring pan is 170° C.; and the basic bituminous mixture with ultra-large pore is obtained.

Preparation of the Resin Infusion Type Water-Permeable Pavement Material

The mass ratio of the waterborne epoxy resin, the waterborne curing agent, the toughening agent to the diluting agent is: 100:80:4:4. The waterborne epoxy resin, the waterborne curing agent, the toughening agent and the diluting agent are selected for standby; the waterborne epoxy resin is added in a container; and the waterborne curing agent, the toughening agent and the diluting agent are added and simultaneously stirred for 5 min to form a resin mixture.

Firstly, the basic bituminous mixture is wrapped with the material of a preservative film and the like (only an infusion surface is left); then, the above-mentioned resin mixture is infused (the mass ratio of the basic bituminous mixture to the resin mixture is 100:20); and after maintenance for 1 h, the resin infusion type water-permeable pavement material is obtained.

The above-mentioned coarse aggregate is basalt having a maximum nominal grain size of 16 mm.

The above-mentioned fine aggregate is basalt, having a maximum nominal grain size of 4.75 mm.

The above-mentioned fillers are limestone mineral powder.

The above-mentioned high-viscous modified bitumen is high-viscosity modified bitumen produced by Guangzhou Luxiang Co., Ltd. (Major performance indexes: absolute viscosity of 87000 Pa·s at 60° C., and softening point of 95° C.).

The above-mentioned waterborne epoxy resin is waterborne epoxy resin HTW-608.

The above-mentioned waterborne curing agent s waterborne curing agent HTW-208.

The above-mentioned toughening agent is dioctyl phthalate.

The above-mentioned diluting agent is xylene.

Embodiment 2

Preparation of the Basic Bituminous Mixture with Ultra-Large Pore

The mass ratio of the coarse aggregate, the fine aggregate, the fillers to the high-viscosity modified bitumen is: 100:1:4:2.5, and the coarse aggregate, the fine aggregate, the fillers and the high-viscosity modified bitumen are selected for standby. The coarse aggregate and the fine aggregate are added in a stirring pan and stirred for 60 s; the high-viscosity modified bitumen is added and stirred for 90 s; finally, the fillers are added and stirred for 90 s, wherein the coarse aggregate, the fine aggregate and the fillers are heated to 170° C., the heating temperature of the high-viscosity modified bitumen is 175° C., and the set temperature of the stirring pan is 175° C.; and the basic bituminous mixture with ultra-large pore is obtained.

Preparation of the Resin Infusion Type Water-Permeable Pavement Material

The mass ratio of the waterborne epoxy resin, the waterborne curing agent, the toughening agent to the diluting agent is: 100:85:5:5. The waterborne epoxy resin, the waterborne curing agent, the toughening agent and the diluting agent are selected for standby; the waterborne epoxy resin is added in a container; and the waterborne curing agent, the toughening agent and the diluting agent are added and simultaneously stirred for 6 min to form a resin mixture.

Firstly, the basic bituminous mixture is wrapped with the material of a preservative film and the like (only an infusion surface is left); then, the above-mentioned resin mixture is infused (the mass ratio of the basic bituminous mixture to the resin mixture is 100:21); and after maintenance for 1 to 2 h, the resin infusion type water-permeable pavement material is obtained.

The above-mentioned coarse aggregate is basalt, having a maximum nominal grain size of 16 mm.

The above-mentioned fine aggregate is basalt, having a maximum nominal grain size of 4.75 mm.

The above-mentioned fillers are limestone mineral powder.

The above-mentioned high-viscous modified bitumen is high-viscosity modified bitumen. (Major performance indexes: absolute viscosity of 87000 Pa·s at 60° C., and softening point of 95° C.).

The above-mentioned waterborne epoxy resin is waterborne epoxy resin HTW-608.

The above-mentioned waterborne curing agent is waterborne curing agent HTW-208.

Embodiment 3

Preparation of the Basic Bituminous Mixture With Ultra-Large Pore

The mass ratio of the coarse aggregate, the fine aggregate, the fillers to the high-viscosity modified bitumen is: 100:2:5:3, and the coarse aggregate, the fine aggregate, the fillers and the high-viscosity modified bitumen are selected for standby. The coarse aggregate and the fine aggregate are added in a stirring pan and stirred for 60 s; the high-viscosity modified bitumen is added and stirred for 90 s; finally, the fillers are added and stirred for 90 s, wherein the coarse aggregate, the fine aggregate and the fillers are heated to 175° C., the heating temperature of the high-viscosity modified bitumen is 180° C., and the set temperature of the stirring pan is 175° C.; and the basic bituminous mixture with ultra-large pore is obtained.

Preparation of the Resin Infusion Type Water-Permeable Pavement Material

The mass ratio of the waterborne epoxy resin, the waterborne curing agent, the toughening agent to the diluting agent is: 100:90:6:6, The waterborne epoxy resin, the waterborne curing agent, the toughening agent and the diluting agent are selected for standby; the waterborne epoxy resin is added in a container; and the waterborne curing agent, the toughening agent and the diluting agent are added and simultaneously stirred for 7 min to form a resin mixture.

Firstly, the basic bituminous mixture is wrapped with the material of a preservative film and the like (only an infusion surface is left); then, the above-mentioned resin mixture is infused (the mass ratio of the basic bituminous mixture to the resin mixture is 100:22); and after maintenance for 1 to 2 h, the resin infusion type water-permeable pavement material is obtained.

The above-mentioned coarse aggregate is basalt, having a maximum nominal grain size of 16 mm.

The above-mentioned fine aggregate basalt, having a maximum nominal grain size of 4.75 mm.

The above-mentioned fillers are limestone mineral powder.

The above-mentioned high-viscous modified bitumen is high-viscosity modified bitumen. (Major performance indexes: absolute viscosity of 87000 Pa·s at 60° C., and softening point of 95° C.).

The above-mentioned waterborne epoxy resin waterborne epoxy resin HTW-608.

The above-mentioned waterborne curing agent is waterborne curing agent HTW-208.

The above-mentioned toughening agent is dioctyl phthalate.

The above-mentioned diluting agent is xylene.

Embodiment 4

Preparation of the Basic Bituminous Mixture with Ultra-Large Pore

The mass ratio of the coarse aggregate, the fine aggregate, the fillers to the high-viscosity modified bitumen is: 100:3:6:3.5, and the coarse aggregate, the fine aggregate, the fillers and the high-viscosity modified bitumen are selected for standby. The coarse aggregate and the fine aggregate are added in a stirring pan and stirred for 60 s: the high-viscosity modified bitumen is added and stirred for 90 s; finally, the fillers are added and stirred for 90 s, wherein the coarse aggregate, the fine aggregate and the fillers are heated to 180° C., the heating temperature of the high-viscosity modified bitumen is 185° C., and the set temperature of the stirring pan is 180° C.; and the basic bituminous mixture with ultra-large pore is obtained.

Preparation of the Resin Infusion Type Water-Permeable Pavement Material

The mass ratio of the waterborne epoxy resin, the waterborne curing agent, the toughening agent to the diluting agent is: 100:95:7:7. The waterborne epoxy resin, the waterborne curing agent, the toughening agent and the diluting agent are selected for standby; the waterborne epoxy resin is added in a container; and the waterborne curing agent, the toughening agent and the diluting agent are added and simultaneously stirred for 8 min to form a resin mixture.

Firstly, the basic bituminous mixture is wrapped with the material of a preservative film and the like (only an infusion surface is left); then, the above-mentioned resin mixture is infused (the mass ratio of the basic bituminous mixture to the resin mixture is 100:23); and after maintenance for 1 to 2 h, the resin infusion type water-permeable pavement material is obtained.

The above-mentioned coarse aggregate is basalt, having a maximum nominal grain size of 16 mm.

The above-mentioned fine aggregate is basalt, having a maximum nominal grain size of 4.75 mm.

The above-mentioned fillers are limestone mineral powder.

The above-mentioned high-viscous modified bitumen is high-viscosity modified bitumen. (Major performance indexes: absolute viscosity of 87000 Pa·s at 60° C., and softening point of 95° C.).

The above-mentioned waterborne epoxy resin is waterborne epoxy resin HTW-609.

The above-mentioned waterborne curing agent is waterborne curing agent HTW-208.

The above-mentioned toughening agent is dioctyl phthalate.

The above-mentioned diluting agent is xylene.

Embodiment 5

Preparation of the Basic Bituminous Mixture with Ultra-Large Pore

The mass ratio of the coarse aggregate, the fine aggregate, the fillers to the high-viscosity modified bitumen is: 100:5:7:4, and the coarse aggregate, the fine aggregate, the fillers and the high-viscosity modified bitumen are selected for standby. The coarse aggregate and the fine aggregate are added in a stirring pan and stirred for 60 s; the high-viscosity modified bitumen is added and stirred for 90 s; finally, the fillers are added and stirred for 90 s, wherein the coarse aggregate, the fine aggregate and the fillers are heated to 190° C., the heating temperature of the high-viscosity modified bitumen is 190° C., and the set temperature of the stirring pan is 180° C.; and the basic bituminous mixture with ultra-large pore is obtained.

Preparation of the Resin Infusion Type Water-Permeable Pavement Material

The mass ratio of the waterborne epoxy resin, the waterborne curing agent, the toughening agent to the diluting agent is: 100:100:10:8. The waterborne epoxy resin. the waterborne curing agent, the toughening agent and the diluting agent are selected for standby; the waterborne epoxy resin is added in a container; and the waterborne curing agent, the toughening agent and the diluting agent are added and simultaneously stirred for 10 min to form a resin mixture.

Firstly, the basic bituminous mixture is wrapped with the material of a preservative film and the like (only an infusion surface is left); then, the above-mentioned resin mixture is infused (the mass ratio of the basic bituminous mixture to the resin mixture is 100:25); and after maintenance for 1 to 2 h, the resin infusion type water-permeable pavement material is obtained.

The above-mentioned coarse aggregate is basalt, having a maximum nominal grain size of 16 mm.

The above-mentioned fine aggregate is basalt, laving a maximum nominal grain size of 4.75 mm.

The above-mentioned fillers are limestone mineral powder.

The above-mentioned high-viscous modified bitumen is high-viscosity modified bitumen. (Major performance indexes; absolute viscosity of 87000 Pa·s at 60° C., and softening point of 95° C.).

The above-mentioned waterborne epoxy resin is waterborne epoxy resin HTW-609.

The above-mentioned waterborne curing agent is waterborne curing agent HTW-208.

The above-mentioned toughening agent is dibutyl phthalate.

The above-mentioned diluting agent is xylene.

Refer to the following standards for the performance tests of all parameters of the resin infusion type water-permeable pavement material prepared and obtained by the above-mentioned embodiments, and see Table 1 for parameter values:

① Rut test: Standard Test Methods of Bitumen and Bituminous Mixtures for Highway Engineering JTG E20-2011 (T0719-2011).

② Water stability test, for testing residual immersion Marshall stability and freezing-thawing split strength ratio: Standard Test Methods of Bitumen and Bituminous Mixtures for Highway Engineering JTG E20-2011 (T0709-2011, T0729-2000).

③ Low-temperature bending test, for testing the ultimate bending strain at −10° C.: Standard Test Methods of Bitumen and Bituminous Mixtures for Highway Engineering JTG E20-2011 (T 0715-2011).

④ Shear strength: A uniaxial penetration test is adopted. Test conditions: ① sample molding: ϕ100 mm×100 mm; ② test temperature: 60° C.; keeping the temperature for 6 h; ③ loading rate: 1 mm/min.

⑤ Porosity and communication porosity: Standard Test Methods of Bitumen and Bituminous Mixtures for Highway Engineering JTG E20-2011 (T0708-2011).

⑥ Water permeability coefficient: Field Test Methods of Subgrade and Pavement for Highway Engineering JTG E60-2008 (T 0971-2008).

TABLE 1

| Performance Parameters | Embodiment 1 | Embodiment 2 | Embodiment 3 | Embodiment 4 | Embodiment 5 |
|---|---|---|---|---|---|
| Dynamic stability at 60° C. (times/mm) | 4890 | 5160 | 6560 | 6329 | 7032 |
| Residual immersion Marshall stability | 91.4% | 92.2% | 92.0% | 93.2% | 92.5% |
| Freezing-thawing split strength ratio | 89.5% | 91.2% | 92.1% | 92.4% | 93.0% |
| Bending strain at −10° C. (μξ) | 2879 | 3012 | 3145 | 3267 | 3279 |
| Shear strength (MPa) | 1.03 | 1.22 | 1.31 | 1.35 | 1.46 |
| Porosity (%) | 23.2 | 23.0 | 22.5 | 22.0 | 21.2 |
| Communication porosity (%) | 17.4 | 16.2 | 16.0 | 15.3 | 14.9 |
| Water permeability coefficient (ml/min) | 3204 | 3100 | 2967 | 3023 | 2968 |

Although the embodiments disclosed by the present invention are described as above, the contents described are only for the convenience of understanding the embodiments adopted by the present invention, rather than for a limitation to the present invention. Any of those skilled in the art of the present invention can make any modification and change on forms and details of the implementation on the premise of not deviating from the spirit and the scope disclosed by the present invention. However, the protection scope of the patent of the present invention must be still in accordance with the scope defined by the appended claims.

We claim:

1. A preparation method for a resin infusion type water-permeable pavement material, characterized in that said method comprises:
   selecting a plurality of filler particles and a high-viscosity bitumen;
   putting basalt, diabase or diorite into a stirring device and stirring for 60 s; adding the high-viscosity bitumen and stirring for 90 s; then, adding the plurality of filler particles and stirring for 90 s; and heating the stirring device to a temperature of 170° C. to obtain the basic bituminous mixture;
   adding a waterborne epoxy resin in a container, and adding a waterborne curing agent, a toughening agent and the diluting agent in the waterborne epoxy resin and stirring evenly to form a resin mixture; and
   infusing said basic bituminous mixture into the resin mixture and maintaining for 1 to 2 h to obtain the resin infusion type water-permeable pavement material;
   absolute viscosity of said high-viscosity bitumen is 87000 Pa·s at 60° C., and softening point is 95° C.

2. The preparation method for the resin infusion type water-permeable pavement material of claim 1, characterized in that before said basalt, diabase or diorite, said plurality of filler particles and said high-viscosity bitumen are mixed, said basalt, diabase or diorite and said plurality of filler particles are respectively heated to 165° C. and the heating temperature of the high-viscosity bitumen is 170° C.

3. The preparation method for the resin infusion type water-permeable pavement material of claim 1, characterized in that the mass ratio of said basic bituminous mixture to said resin mixture is 100:20-25.

4. The preparation method for the resin infusion type water-permeable pavement material of claim 1, characterized in that the void of said basic bituminous mixture is 30% to 35%.

5. The preparation method for the resin infusion type water-permeable pavement material of claim 1, wherein
- said plurality of filler particles are limestone mineral powder;
- said toughening agent is dioctyl phthalate or dibutyl phthalate; and
- said diluting agent is xylene.

\* \* \* \* \*